US010830139B2

(12) United States Patent
Hendrickson

(10) Patent No.: US 10,830,139 B2
(45) Date of Patent: Nov. 10, 2020

(54) FITTING FOR MULTIWALL TUBE

(71) Applicant: United Technologies Corporation, Farmington, CT (US)

(72) Inventor: Timothy R Hendrickson, West Hartford, CT (US)

(73) Assignee: Raytheon Technologies Corporation, Farmington, CT (US)

(*) Notice: Subject to any disclaimer, the term of this patent is extended or adjusted under 35 U.S.C. 154(b) by 638 days.

(21) Appl. No.: 15/425,410

(22) Filed: Feb. 6, 2017

(65) Prior Publication Data

US 2018/0223734 A1 Aug. 9, 2018

(51) Int. Cl.
| | |
|---|---|
| F02C 7/06 | (2006.01) |
| F16L 15/00 | (2006.01) |
| F16L 39/00 | (2006.01) |
| F01D 25/16 | (2006.01) |
| F01D 9/06 | (2006.01) |
| F01D 25/18 | (2006.01) |

(52) U.S. Cl.
CPC ............... *F02C 7/06* (2013.01); *F01D 9/065* (2013.01); *F01D 25/162* (2013.01); *F01D 25/18* (2013.01); *F16L 15/006* (2013.01); *F16L 39/005* (2013.01); *F05D 2220/32* (2013.01); *F05D 2240/50* (2013.01); *F05D 2260/231* (2013.01); *F05D 2260/98* (2013.01); *Y02T 50/60* (2013.01)

(58) Field of Classification Search
CPC ....... F16L 39/005; F16L 11/20; F16L 15/006; F02C 7/06
USPC ...... 285/123.1, 123.3, 123.15, 123.16, 124.1
See application file for complete search history.

(56) References Cited

U.S. PATENT DOCUMENTS

| 3,248,880 A | 5/1966 | Hul, Jr. |
|---|---|---|
| 3,272,537 A | 9/1966 | Bellatorre |
| (Continued) | | |

FOREIGN PATENT DOCUMENTS

| CN | 101011860 | 8/2007 |
|---|---|---|
| EP | 2258929 | 12/2010 |
| (Continued) | | |

OTHER PUBLICATIONS

USPTO, Restriction / Election Requirement dated Jan. 2, 2019 in U.S. Appl. No. 15/344,195.
(Continued)

*Primary Examiner* — Matthew Troutman
*Assistant Examiner* — Fannie C Kee
(74) *Attorney, Agent, or Firm* — Snell & Wilmer L.L.P.

(57) ABSTRACT

A mid-turbine frame for a gas turbine engine may comprise a bearing system including a bearing housing. A first tube may define a first fluid passage configured to carry a first fluid to the bearing system. An outer sleeve may be disposed around the first tube and may define a chamber between the first tube and the outer sleeve. A first fitting may be coupled to the first tube and to the outer sleeve. The first fitting may comprise an inner portion having an inner surface further defining the first fluid passage. An outer portion may be disposed around the inner portion and may further define the chamber therebetween. The chamber may be configured to contain a fluid. An outer surface may have a first mating surface comprising a frustoconical shape. A flange may extend radially outward from the outer surface.

9 Claims, 7 Drawing Sheets

(56) References Cited

U.S. PATENT DOCUMENTS

| | | | |
|---|---|---|---|
| 3,312,448 A | | 4/1967 | Hull, Jr. |
| 3,316,931 A | * | 5/1967 | Elrod .................... F16L 59/141 |
| | | | 137/339 |
| 3,984,059 A | * | 10/1976 | Davies .................... B63B 27/24 |
| | | | 141/387 |
| 4,156,342 A | | 5/1979 | Danko et al. |
| 4,765,658 A | * | 8/1988 | Reche .................... F16L 37/248 |
| | | | 285/124.2 |
| 4,947,639 A | | 8/1990 | Hibner |
| 4,967,460 A | | 11/1990 | Runyan |
| 4,972,671 A | | 11/1990 | Asselin |
| 4,983,051 A | | 1/1991 | Hibner |
| 5,110,257 A | | 5/1992 | Hibner |
| 5,203,384 A | | 4/1993 | Hansen |
| 5,628,532 A | | 5/1997 | Ashcraft |
| 5,839,268 A | | 11/1998 | Morris |
| 6,086,114 A | | 7/2000 | Ziu |
| 6,412,820 B1 | | 7/2002 | Erps |
| 6,438,938 B1 | | 8/2002 | Burkholder |
| 7,500,788 B2 | | 3/2009 | Joyner |
| 8,230,974 B2 | | 7/2012 | Parnin |
| 8,517,749 B2 | * | 8/2013 | Marshall ................. F16L 59/18 |
| | | | 439/194 |
| 9,494,048 B1 | | 11/2016 | Parnin |
| 2003/0230274 A1 | | 12/2003 | Williams |
| 2010/0207379 A1 | | 8/2010 | Olver |
| 2010/0275572 A1 | | 11/2010 | Durocher |
| 2010/0276026 A1 | | 11/2010 | Powell |
| 2011/0085895 A1 | | 4/2011 | Durocher |
| 2011/0284103 A1 | | 11/2011 | Davis |
| 2013/0022446 A1 | | 1/2013 | Chevillot |
| 2013/0189071 A1 | | 7/2013 | Durocher |
| 2013/0224460 A1 | | 8/2013 | van der Mee et al. |
| 2013/0280043 A1 | | 10/2013 | Parnin |
| 2013/0318940 A1 | | 12/2013 | Parnin |
| 2014/0116561 A1 | | 5/2014 | Krall |
| 2015/0130183 A1 | | 5/2015 | Statler, III |
| 2015/0219011 A1 | | 8/2015 | Muldoon |
| 2015/0354382 A1 | | 12/2015 | Pakkala |
| 2016/0215652 A1 | | 7/2016 | Mastro |
| 2016/0305284 A1 | | 10/2016 | Mastro |
| 2016/0312699 A1 | | 10/2016 | Teicholz |
| 2017/0114662 A1 | | 4/2017 | Mastro |
| 2017/0234158 A1 | | 8/2017 | Savela |
| 2018/0073395 A1 | | 3/2018 | Parnin |
| 2018/0128122 A1 | | 5/2018 | Avis |
| 2018/0128124 A1 | | 5/2018 | Avis |
| 2018/0230854 A1 | | 8/2018 | Parnin |
| 2018/0283211 A1 | | 10/2018 | Parnin |
| 2018/0306062 A1 | | 10/2018 | Avis |

FOREIGN PATENT DOCUMENTS

| | | |
|---|---|---|
| EP | 2662537 | 11/2013 |
| EP | 2944774 | 11/2015 |
| EP | 3081760 | 10/2016 |
| EP | 3318729 | 5/2018 |
| FR | 2341094 | 9/1977 |
| FR | 3014478 | 6/2015 |
| GB | 623615 | 5/1949 |
| GB | 2218751 | 11/1989 |
| WO | 2014051658 | 4/2014 |
| WO | 2014152123 | 9/2014 |
| WO | 2015102779 | 7/2015 |

OTHER PUBLICATIONS

USPTO, Pre-Interview First Office Action dated Dec. 27, 2018 in U.S. Appl. No. 15/425,303.
USPTO, Restriction / Election Requirement dated Jan. 3, 2019 in U.S. Appl. No. 15/425,337.
USPTO, Non-Final Office Action dated Jan. 3, 2019 in U.S. Appl. No. 15/344,157.
European Patent Office, European Search Report dated Jun. 12, 2018 in Application No. 18155139.1-1006.
European Patent Office, European Search Report dated Jun. 22, 2018 in Application No. 18155177.1-1010.
European Patent Office, European Search Report dated Jun. 27, 2018 in Application No. 18155144.1-1007.
European Patent Office, European Search Report dated Jul. 4, 2018 in Application No. 18154684.7-1006.
USPTO, Corrected Notice of Allowance dated Jul. 2, 2019 in U.S. Appl. No. 15/425,337.
USPTO, Non-Final Office Action dated Jul. 3, 2019 in U.S. Appl. No. 15/425,303.
USPTO, Notice of Allowance dated Aug. 29, 2019 in U.S. Appl. No. 15/425,303.
USPTO, Non-Final Office Action dated Jan. 23, 2019 in U.S. Appl. No. 15/425,372.
USPTO, Non-Final Office Action dated Jan. 24, 2019 in U.S. Appl. No. 15/344,132.
USPTO, First Action Interview Office Action dated Jan. 31, 2019 in U.S. Appl. No. 15/425,303.
USPTO, Non-Final Office Action dated Mar. 8, 2019 in U.S. Appl. No. 15/344,195.
European Patent Office, European Search Report dated Mar. 23, 2018 in Application No. 17199700.0-1006.
European Patent Office, European Search Report dated Mar. 23, 2018 in Application No. 17199693.7-1006.
U.S. Appl. No. 15/344,132, filed Nov. 4, 2016 and entitled Apparatus and Method for Providing Fluid to a Bearing Damper.
U.S. Appl. No. 15/344,157, filed Nov. 4, 2016 and entitled Apparatus and Method for Providing Fluid to a Bearing Damper.
U.S. Appl. No. 15/344,185, filed Nov. 4, 2016 and entitled Apparatus and Method for Providing Fluid to a Bearing Damper.
U.S. Appl. No. 15/344,195, filed Nov. 4, 2016 and entitled Apparatus and Method for Providing Fluid to a Bearing Damper.
U.S. Appl. No. 15/425,303, filed Feb. 6, 2017 and entitled Tube Fitting.
U.S. Appl. No. 15/425,337, filed Feb. 6, 2017 and entitled Multiwall Tube and Fitting for Bearing Oil Supply.
U.S. Appl. No. 15/425,372, filed Feb. 6, 2017 and entitled Threaded Fitting for Tube.
USPTO, Non-Final Office Action dated Apr. 29, 2019 in U.S. Appl. No. 15/425,337.
USPTO, Final Office Action dated May 3, 2019 in U.S. Appl. No. 15/425,303.
USPTO, Non-Final Office Action dated May 16, 2019 in U.S. Appl. No. 15/344,185.
USPTO, Final Office Action dated May 30, 2019 in U.S. Appl. No. 15/344,157.
USPTO, Notice of Allowance dated Jun. 5, 2019 in U.S. Appl. No. 15/425,372.
USPTO, Notice of Allowance dated Jun. 7, 2019 in U.S. Appl. No. 15/425,337.
USPTO, Advisory Action dated Jun. 10, 2019 in U.S. Appl. No. 15/425,303.
USPTO, Final Office Action dated Jun. 10, 2019 in U.S. Appl. No. 15/344,132.

* cited by examiner

FITTING FOR MULTIWALL TUBE

FIELD

The present disclosure relates to gas turbine engines and, more particularly, to lubricant transport for bearing systems of gas turbine engine.

BACKGROUND

Gas turbine engines typically include a fan section, a compressor section, a combustor section and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Gas turbine engines generally include one or more bearing systems that support rotation of various components relative to an engine static structure or engine case. Gas turbine engines may use oil for cooling and lubrication of the bearing systems. Lubrication systems, such as those used in aircraft gas turbine engines, supply lubricant to bearings, gears and other engine components that use lubrication. The lubricant, typically oil, cools the components and protects them from wear. A typical oil lubrication system includes conventional components such as an oil tank, pump, filter and oil supply conduits. Tubing and conduits of various types can be used to route fluids throughout an engine, for example. Various double wall tubes may be used for delivery and transport of fluids, such as oil. A double wall tube may have an outer passage formed between an inner tube and an outer tube. The inner tube and the outer tube may each carry a fluid, and it may be difficult to maintain separation of the fluids at the exit of a double wall tube. Further, engine oil tubes and fittings may be subjected to relatively high temperatures. Once subjected to excessive heating, oil may undergo coking. Oil coking may cause solid oil deposits to form within oil tubes, causing undesirable effects such as blocked passageways and filters.

SUMMARY

A fitting for a tubing assembly is described herein, in accordance with various embodiments. The fitting may comprise an inner portion having an inner surface defining a first fluid passage. An outer portion may be disposed around the inner portion and may define a chamber therebetween. The chamber may be configured to contain a fluid. An outer surface may have a mating surface comprising a frustoconical shape. A flange may extend radially outward from the outer surface.

In various embodiments, an angle of the mating surface relative to a longitudinal axis of the fitting may range from 15 to 50 degrees. The inner portion and the outer portion may be configured to couple to a multiwall tube. The inner portion and the outer portion may comprise concentric tubes. The flange may comprise a polygonal shape configured to engage a wrench during installation. The outer surface of the fitting may further comprises a threading.

A mid-turbine frame for a gas turbine engine is also provided. The mid-turbine frame for a gas turbine engine may comprise a bearing system including a bearing housing. A first tube may define a first fluid passage configured to carry a first fluid to the bearing system. An outer sleeve may be disposed around the first tube and may define a chamber between the first tube and the outer sleeve. A first fitting may be coupled to the first tube and to the outer sleeve. The first fitting may comprise an inner portion having an inner surface further defining the first fluid passage. An outer portion may be disposed around the inner portion and may further define the chamber therebetween. The chamber may be configured to contain a fluid. An outer surface may have a first mating surface comprising a frustoconical shape. A flange may extend radially outward from the outer surface.

In various embodiments, an angle of the first mating surface relative to a longitudinal axis of the fitting may range from 15 to 50 degrees. The first mating surface of the first fitting contacts a second mating surface of the bearing housing to form an interference fit in response to rotating the first fitting within the bearing housing. An inner tube may be disposed within the first tube. The inner tube may be coupled to the bearing housing by a second fitting. The second fitting may be coupled to the bearing housing and to the first fitting. The flange of the first fitting may comprise a polygonal shape configured to engage a wrench during installation. The outer surface of the first fitting may further comprise a threading configured to thread into the bearing housing. The bearing system may further comprise a bearing compartment. The bearing housing may define a bearing compartment path. The first fluid passage may be in fluid communication with the bearing compartment path.

A method of delivering lubricant to a bearing system is also provided. The method may comprise the step of coupling a first tube to a first fitting. The first tube may define a first fluid passage. The first fitting may have a first mating surface. The method may comprise the step of coupling an outer sleeve to the first fitting. The first tube and the outer sleeve may define a chamber therebetween. The method may comprise the step of inserting the first fitting into a bearing housing. The bearing housing may have a second mating surface with a complementary shape to the first mating surface of the first fitting. The method may comprise the step of rotating the first fitting about a longitudinal axis of the first fitting to contact the first mating surface of the first fitting with the second mating surface of the bearing housing.

In various embodiments, the method may further comprise the step of, prior to inserting the first fitting into the bearing housing, coupling an inner tube to a second fitting and coupling the second fitting to the first fitting. The step of rotating the first fitting may couple the second fitting to the bearing housing. The first fluid passage may be defined between the first tube and the inner tube. A second fluid passage may be defined by the inner tube. The method may further comprise the steps of delivering a first fluid through the first fluid passage, and delivering a second fluid through the second fluid passage.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

The present disclosure relates to fittings for multiwall tubing assemblies. A multiwall tube may define two or more concentric fluid paths or fluid chambers. One or more fittings may join an end of multiwall tube with a bearing system, while maintaining separation of the fluid paths and/or fluid chamber.

Figure 1:
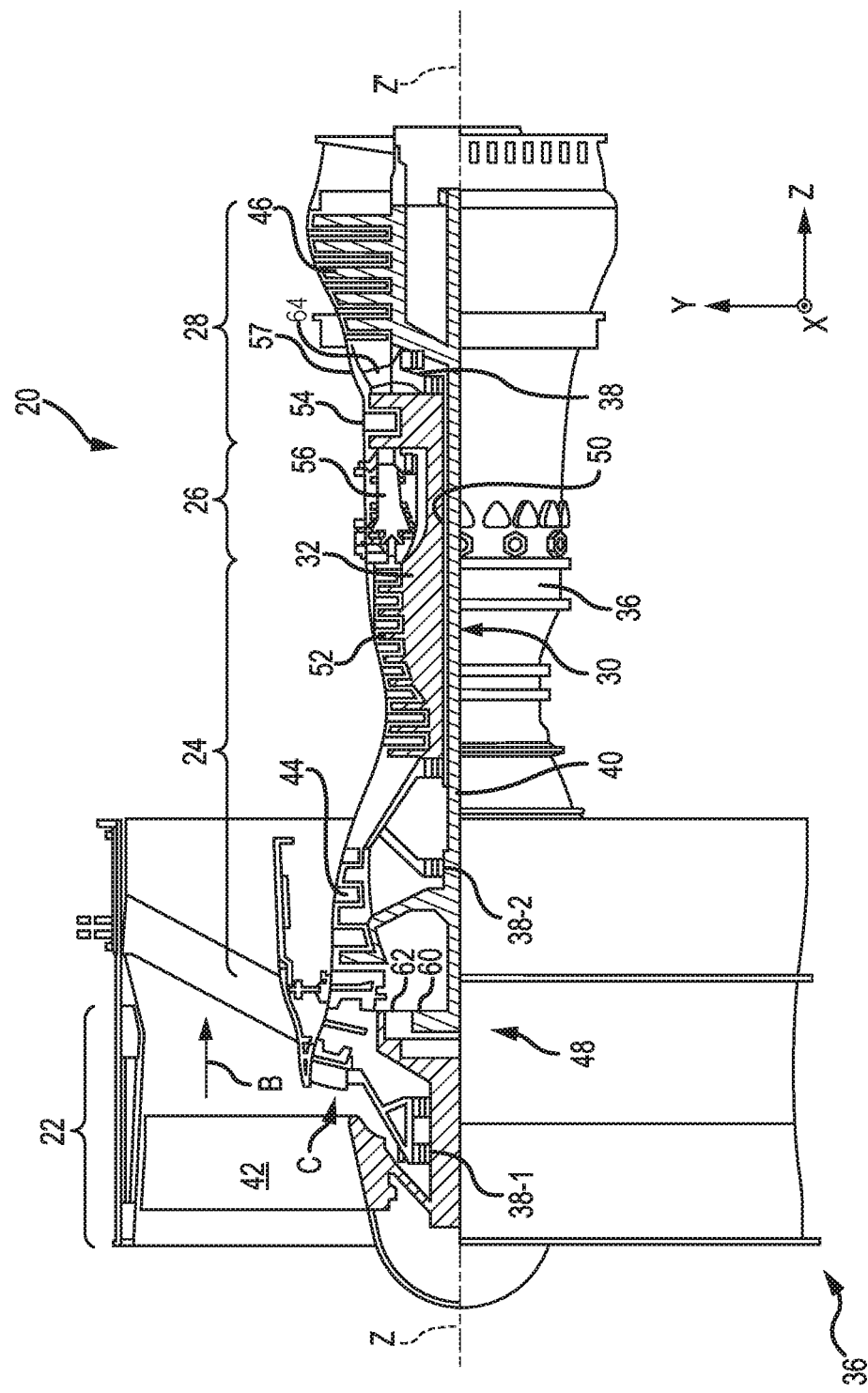
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow path B while compressor section 24 can drive coolant along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis Z-Z' relative to an engine static structure 36 or engine case via several bearing systems 38, 38-1, and 38-2. Engine central longitudinal axis Z-Z' is oriented in the z direction on the provided xyz axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis Z-Z', which is collinear with their longitudinal axes. As used herein, a "high pressure" compressor or turbine experiences a higher pressure than a corresponding "low pressure" compressor or turbine.

The airflow of core flow path C may be compressed by low pressure compressor 44 then high pressure compressor 52, mixed and burned with fuel in combustor 56, then expanded over high pressure turbine 54 and low pressure turbine 46. Mid-turbine frame 57 may include airfoils 64, which are in core flow path C. Turbines 46, 54 rotationally drive the respective low speed spool 30 and high speed spool 32 in response to the expansion.

Gas turbine engine 20 may be, for example, a high-bypass ratio geared engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

Figure 2:
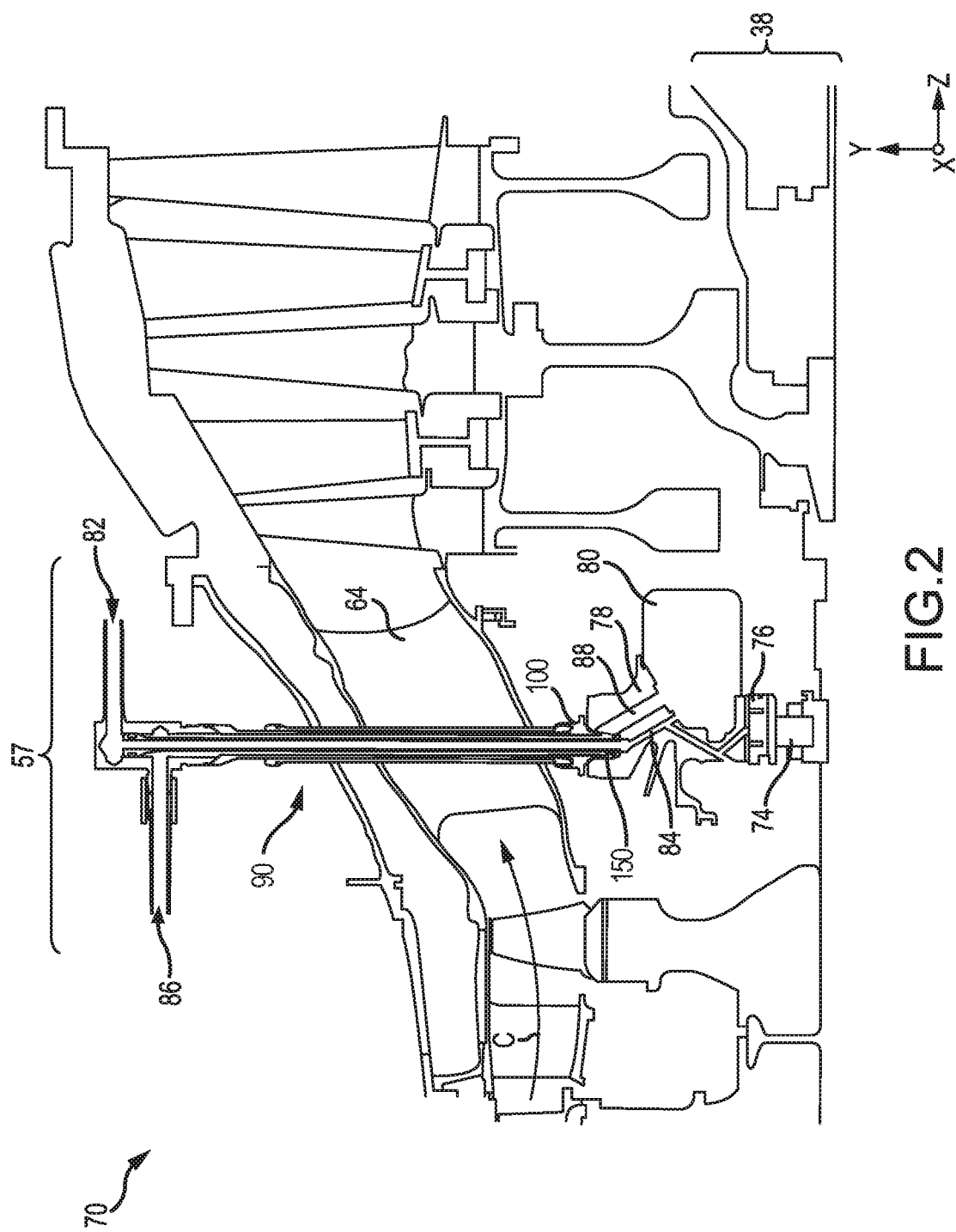
FIG. 2 illustrates a cross-sectional view of a turbine section with a mid-turbine frame and an oil supply tube, in accordance with various embodiments.

With reference now to FIG. 2 and still to FIG. 1, a portion of an engine section 70 is shown, in accordance with various embodiments. Although engine section 70 is illustrated in FIG. 2, for example, as a turbine section, it will be understood that the tubing assemblies in the present disclosure are not limited to the turbine section, and could extend to other sections of the gas turbine engine 20 and to other bearing assemblies. In various embodiments, engine section 70 may include mid-turbine frame 57 of gas turbine engine 20. Mid-turbine frame 57 may be located aft of high pressure turbine 54 and forward of low pressure turbine 46 and may be mechanically coupled to bearing system 38.

In various embodiments, mid-turbine frame 57 may include a bearing 74, a bearing damper 76, and a bearing housing 78, which may define a bearing compartment 80. Mid-turbine frame 57 may include a multiwall tubing assembly 90 for fluid delivery to bearing system 38. Multiwall tubing assembly 90 may be coupled to bearing housing 78 and may be configured to transport fluid to and/or from bearing compartment 80 and bearing damper 76. Bearing housing 78 may define a bearing damper path 84 and a bearing compartment path 88. Multiwall tubing assembly 90 may deliver a second fluid from a second fluid source 82 to bearing damper 76 through a bearing damper path 84 defined by bearing housing 78. The first fluid may be used to lubricate bearing damper 76. Multiwall tubing assembly 90 may deliver a first fluid from a first fluid source 86 to bearing compartment 80 through a bearing compartment path 88 defined by bearing housing 78. The second fluid may be used to lubricate at least a portion of bearing compartment 80.

Multiwall tubing assembly 90 may extend through airfoil 64. Hot exhaust gas in core flow path C may impinge on airfoil 64 which may cause airfoil 64 to increase in temperature due to convective heat transfer from the hot exhaust. In various embodiments, heat may radiate to other nearby components which may cause the nearby components to increase in temperature. In return, the nearby components may transfer heat to other adjacent components and/or fluids. For example, heat may radiate from airfoil 64 to multiwall tubing assembly 90 and may convectively transfer heat from airfoil 64 to multiwall tubing assembly 90. Multiwall tubing assembly 90 may be configured to limit heat transfer to the fluids within multiwall tubing assembly 90.

Figure 3:
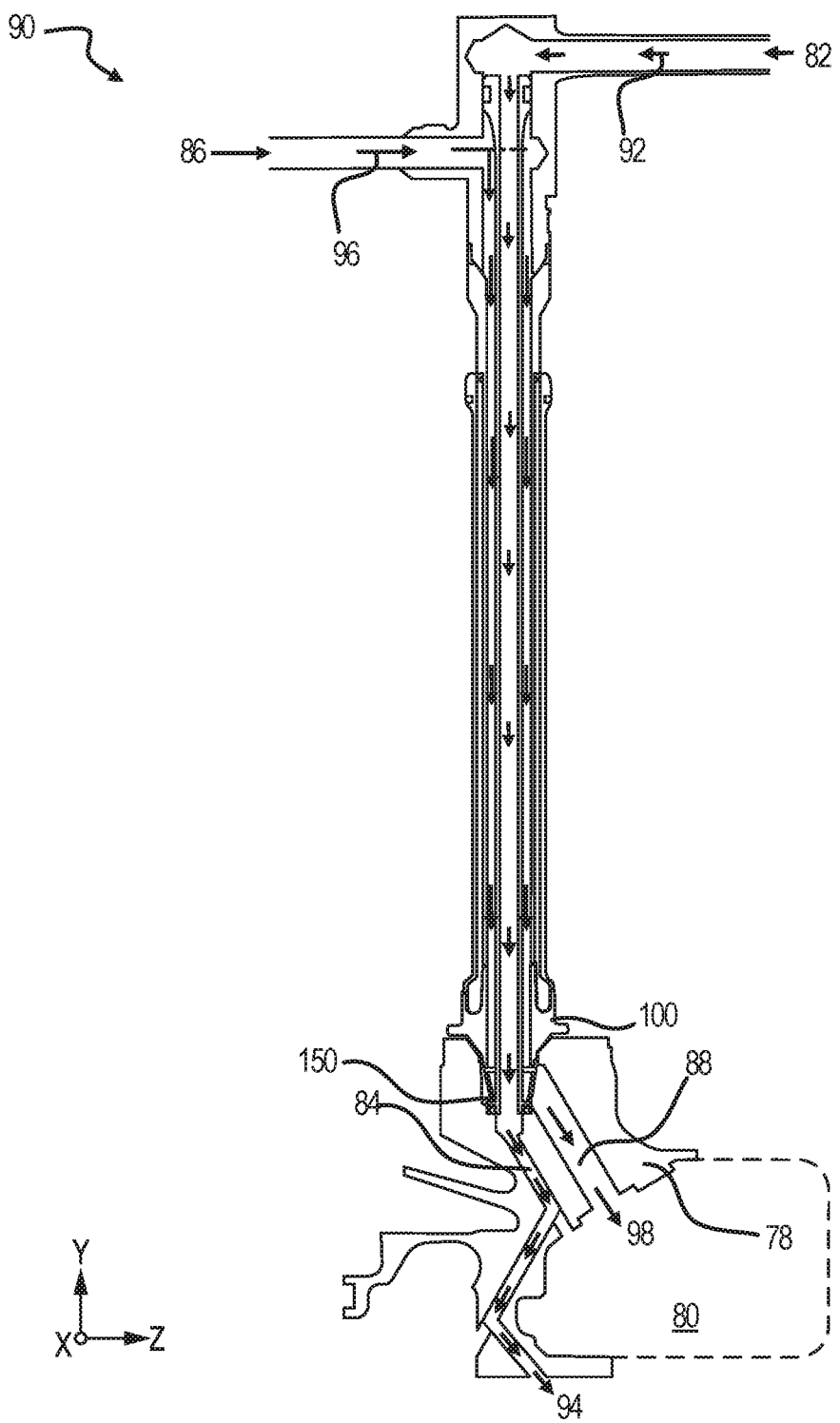
FIG. 3 illustrates a cross-sectional view of a multiwall tubing assembly and a bearing compartment, in accordance with various embodiments.

Referring to FIG. 3, a multiwall tubing assembly 90 is shown, in accordance with various embodiments. Multiwall tubing assembly 90 may be coupled to bearing housing 78 by one or more fittings, such as first fitting 100 and/or second fitting 150, configured to secure multiwall tubing assembly 90 to bearing housing 78. Multiwall tubing assembly 90 with first fitting 100 may be configured to deliver a first fluid 96 from first fluid source 86 to bearing compartment path 88. First fluid 96 may flow through multiwall tubing assembly 90, first fitting 100, second fitting 150 and bearing compartment path 88 and to bearing compartment 80 through a first outlet 98 in bearing housing 78. Multiwall tubing assembly 90 with first fitting 100 and second fitting 150 may be configured to deliver a second fluid 92 from second fluid source 82 to bearing damper path 84. Second fluid 92 flows through multiwall tubing assembly 90, second fitting 150 and bearing damper path 84 and to bearing damper 76 (FIG. 2) through a second outlet 94 in bearing housing 78. Multiwall tubing assembly 90 with fittings 100, 150 may be configured to maintain second fluid 92 separated from first fluid 96. First fluid 96 and second fluid 92 may contain similar or different fluids, which may have similar or different temperatures and/or pressures.

Figure 4A:
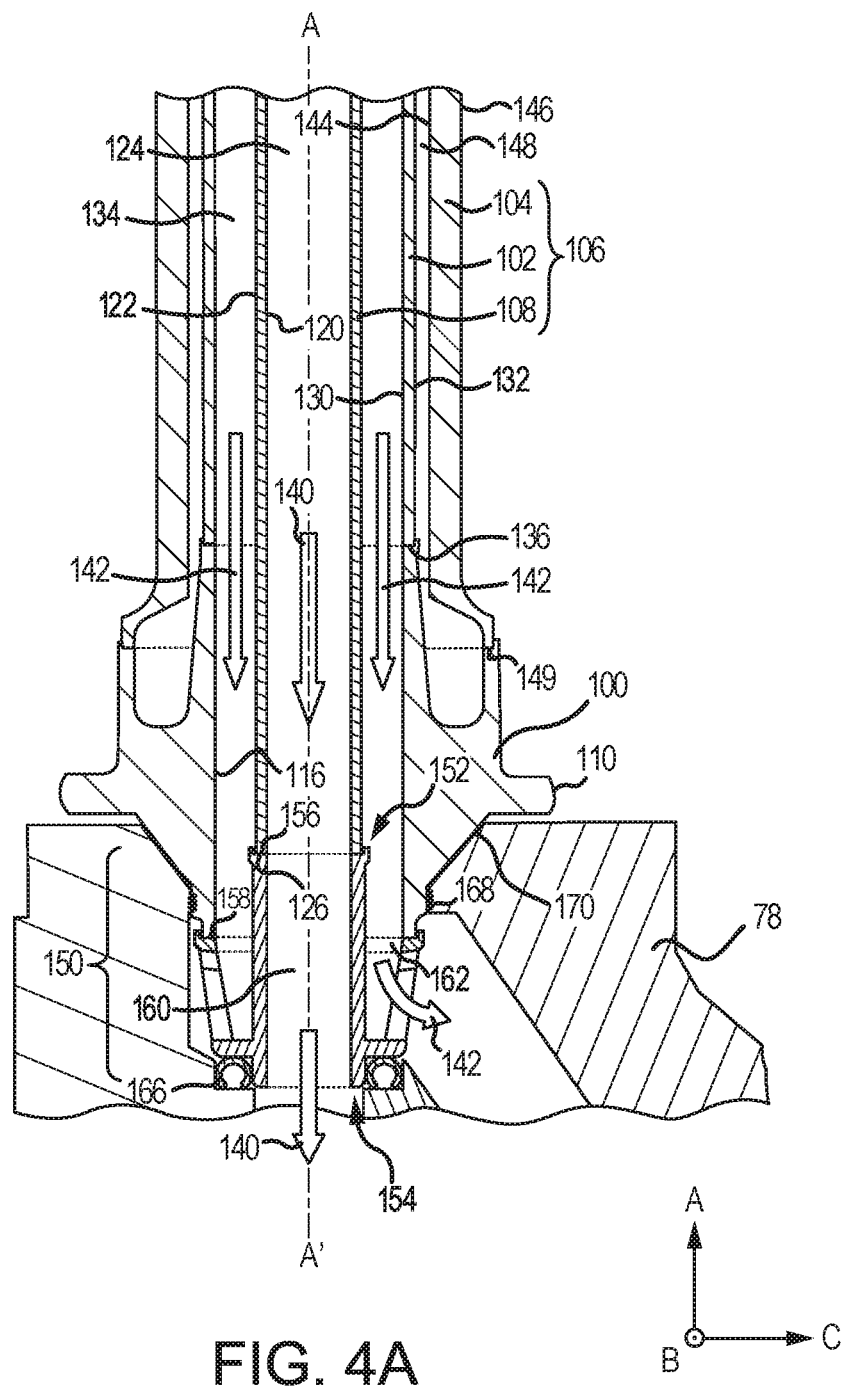
FIGS. 4A and 4B illustrate cross-sectional views, respectively, of a multiwall tubing assembly, in accordance with various embodiments.
Figure 4B:
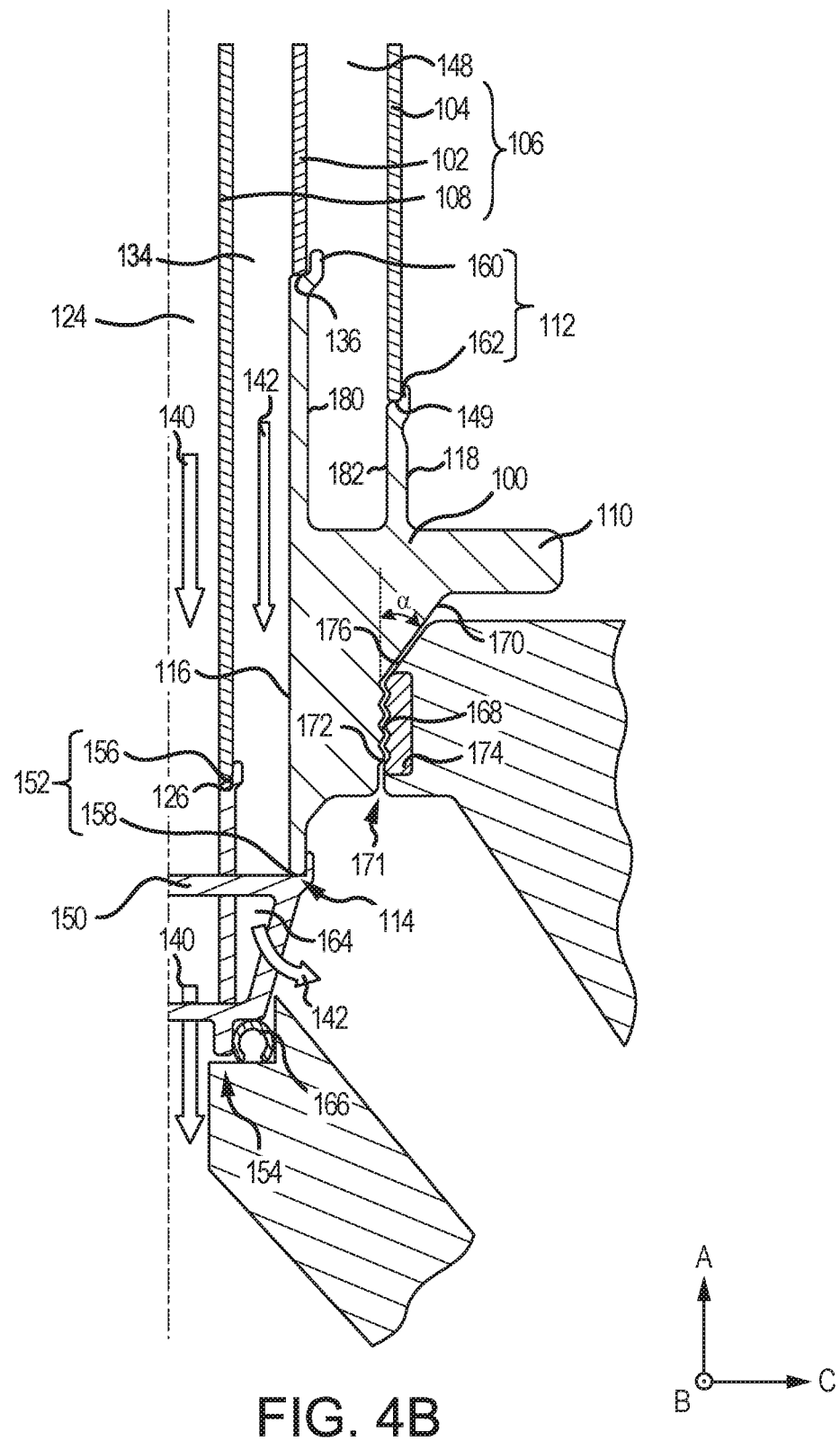

Referring to FIGS. 4A and 4B, a multiwall tubing assembly 90 is shown, in accordance with various embodiments. Multiwall tubing assembly 90 may include one or more tubes, such as a first tube 102 disposed within a second tube or outer sleeve 104. First tube 102 and outer sleeve 104 together may form at least a portion of a multiwall tube 106. First tube 102 and outer sleeve 104 may be configured to couple to bearing housing 78 via first fitting 100. Thus, first fitting 100 is configured to couple a multiwall tube 106.

An inner surface 130 of first tube 102 may define a first fluid path 142 through first fluid passage 134. Outer sleeve 104 disposed around first tube 102 may encase at least a portion of first tube 102. Outer sleeve 104 includes an inner surface 144 and an outer surface 146. An inner surface 144 of outer sleeve 104 and an outer surface 132 of first tube 102 may define a gap or a chamber 148. In various embodiments, chamber 148 may be occupied by a fluid, such as air, thereby providing a thermal shield for first tube 102 and first fluid path 142. Thus, outer sleeve 104 may be configured to prevent heat transfer from surrounding hot air to first tube 102. Chamber 148 may further be configured to contain a fluid, such as oil or other fluid, within outer sleeve 104 in the event that there is a fluid leak from first tube 102. In various embodiments, chamber 148 may contain a fluid and may be a flow path defined by first tube 102 and outer sleeve 104. In various embodiments, first tube 102 and outer sleeve 104 may be concentric about a longitudinal axis A-A', which is collinear with the longitudinal axes of first tube 102 and outer sleeve 104 and which is parallel to the A-direction on the provided ABC axes.

In various embodiments, multiwall tube 106 may further include a third tube or inner tube 108. Inner tube 108 may be disposed within first tube 102 in a concentric and/or coaxial arrangement with first tube 102. Inner tube 108 may be configured to couple to bearing housing 78 via second fitting 150. An inner surface 120 of inner tube 108 may define a second fluid path 140 through second fluid passage 124. First fluid passage 134 may be further defined between first tube 102 and inner tube 108, more specifically, between outer surface 122 of inner tube 108 and an inner surface 130 of first tube 102. Thus, first fluid passage 134 may have a generally annular cross section. Each of first fluid passage 134 and second fluid passage 124 may contain a fluid, such as lubricant, oil, fuel, air or other fluid. First fluid passage 134 and second fluid passage 124 may contain similar or different fluids, which may have similar or different temperatures and/or pressures. First fluid path 142 and second fluid path 140 are each illustrated as flowing in the negative A-direction on the provided ABC axes. It is further contemplated and understood that first fluid path 142 and/or second fluid path 140 may flow in various directions, including the positive A-direction, in accordance with various embodiments. As used herein, "distal" refers to the direction toward the negative A-direction on the provided ABC axes relative to the multiwall tubing assembly 90. As used herein, "proximal" refers to a direction toward the positive A-direction on the provided ABC axes relative to the multiwall tubing assembly 90.

In various embodiments, multiwall tubing assembly 90 may comprise a first fitting 100 configured to couple to first tube 102 and/or outer sleeve 104 to the bearing housing 78. More specifically, a proximal end 112 of first fitting 100 may be configured to couple to a distal end 136 of first tube 102 and to a distal end 149 of outer sleeve 104. Proximal end 112 of first fitting 100 may comprise an inner portion 160 and an outer portion 162. Inner portion 160 and outer portion 162 may be configured to couple to a multiwall tube 106. Inner portion 160 and outer portion 162 may be concentric tubes extending along longitudinal axis A-A' of first fitting 100, and may be configured to couple to concentric tubes of a multiwall tube. Inner portion 160 of first fitting 100 may be configured to couple to distal end 136 of first tube 102. Outer portion 162 of first fitting 100 may be configured to couple to distal end 149 of outer sleeve 104. In various embodiments, inner portion 160 of first fitting 100 may be mechanically fastened, welded, brazed, adhered and/or otherwise attached to distal end 136 of first tube 102, and similarly, outer portion 162 of first fitting 100 may be mechanically fastened, welded, brazed, adhered and/or otherwise to distal end 149 of outer sleeve 104. In various embodiments, first fitting 100 may be coupled to or integral with first tube 102 and/or outer sleeve 104. As used herein, the term "integrated" or "integral" may include being formed as one, single continuous piece (e.g., monolithic). Proximal end 112 of first fitting 100 may be a first axial end of first fitting 100. A distal end 114 of first fitting 100 may be a second axial end of first fitting 100. The distal end 114 of first fitting 100, opposite to the proximal end 112 of first fitting 100, may be configured to couple to a second fitting 150.

First fitting 100 comprises an inner surface 116 and an outer surface 118. Inner surface 116 of first fitting 100 be generally cylindrical and may further define first fluid passage 134, which forms a continuous fluid path for first fluid path 142.

The outer surface 118 of first fitting 100 may comprise, for example, a male mating surface of first fitting 100 having threading 168 disposed about an outer diameter of first fitting 100. Outer surface 118 of first fitting 100 may further comprise a first mating surface 170, which may be configured as a cone seat having a frustoconical shape. First mating surface 170 may be oriented at an angle α ("alpha") relative to longitudinal axis A-A' ranging from 15 to 50 degrees, or ranging from 20 to 45 degrees, or ranging from 30 to 40 degrees. For example, first mating surface 170 may have an angle of about 37 degrees relative to longitudinal axis A-A', wherein "about" in this context only means +/−1°. Threading 168 and first mating surface 170 may provide an interface to connect first fitting 100 to bearing housing 78.

First fitting 100 may further include a flange 110 extending from outer surface 118. In various embodiments, flange 110 may protrude from the body of first fitting 100 in a generally radial outward direction relative to longitudinal axis A-A'. Flange 110 may be a flange integral with the body of first fitting 100. Flange 110 may operate as a wrenching feature and may comprise a polygonal shape to engage a wrench during installation, maintenance, or removal. The configuration and size of flange 110 may vary. For example, the flange 110 may be configured in 6-point hexagonal configuration or 12-point dodecagonal configuration.

First fitting 100 may be inserted into bearing housing 78 and threaded or otherwise attached to bearing housing 78. Bearing housing 78 may define an aperture 171 having a threaded inner diameter with threading 172. In various embodiments, a threading insert 174 may be coupled to bearing housing 78 within aperture 171 and may have threading 172 disposed on a surface of the threading insert 174. Threading 168 of first fitting 100 may be configured to engage with threading 172 of bearing housing 78 and thread into bearing housing 78.

Bearing housing 78 may further include a second mating surface 176, which may include a complementary shape or angle to first mating surface 170 of first fitting 100. Threading 168, 172 may also urge first mating surface 170 of first fitting 100 against second mating surface 176 of bearing housing 78 in response to rotation about longitudinal axis A-A' caused by, for example, rotation of first fitting 100 by flange 110, i.e, a wrenching feature. First fitting 100 by flange 110 may be rotated using a wrench or other tool. In response to rotation of first fitting 100, first mating surface 170 of first fitting 100 may be in sealing contact with second mating surface 176 of bearing housing 78. In various embodiments, first mating surface 170 and second mating surface 176 may impinge each other and may form an interference fit in response to rotating the first fitting 100 within the bearing housing 78. First mating surface 170 and second mating surface 176 may form a fluid resistant seal to maintain first fluid path 142 within bearing housing 78.

Figure 5B:
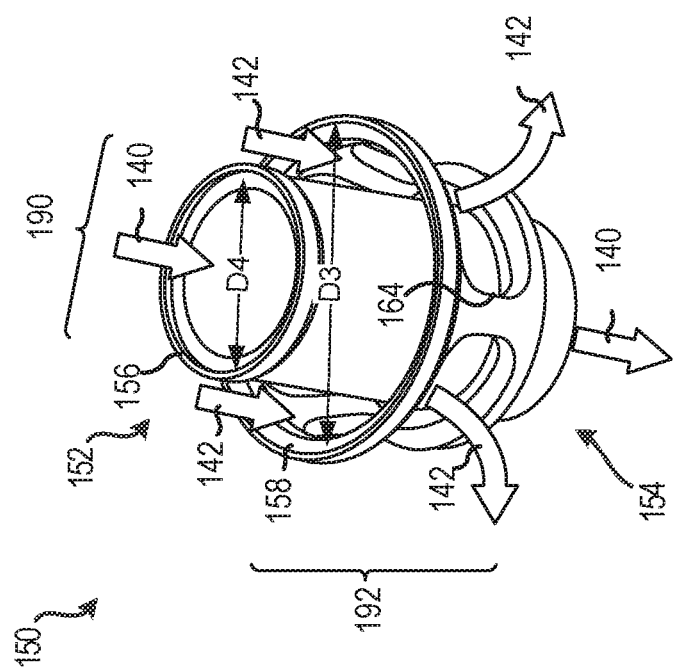
FIGS. 5A and 5B illustrate perspective views of fittings for a multiwall tube, in accordance with various embodiments.
Figure 5A:
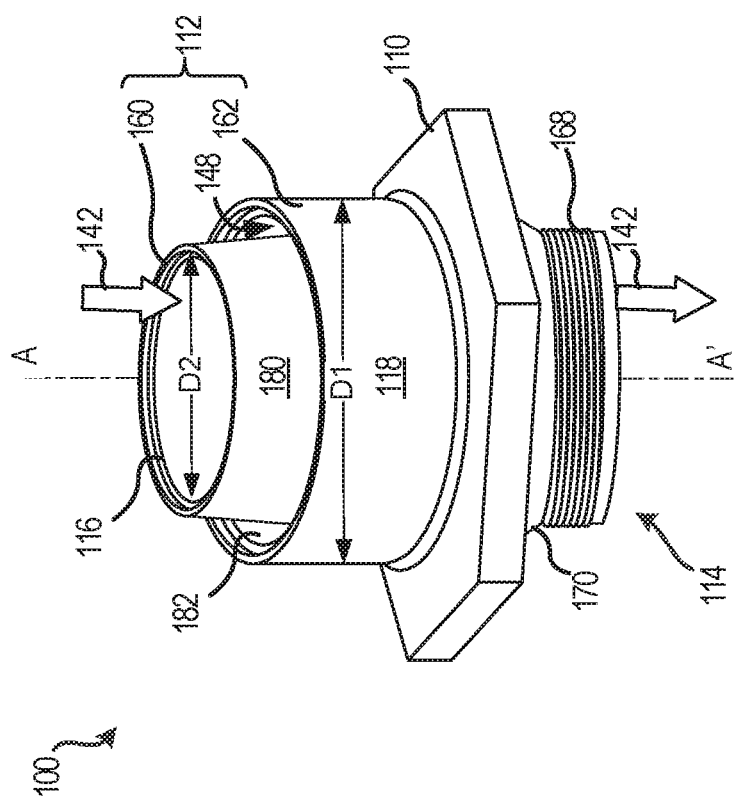

With reference to FIG. 5A and still to FIGS. 4A and 4B, a perspective view of first fitting 100 is shown, in accordance with various embodiments. First fitting 100 may include an outer portion 162 formed concentrically around inner portion 160. Inner portion 160 and outer portion 162 may be integrally formed. Inner portion 160 and outer portion 162 may comprise tubular portions or flanges, which extend axially, along longitudinal axis A-A', toward proximal end 112 of first fitting 100. The inner surface 116 of first fitting 100 may also be the inner surface of inner portion 160. Inner portion 160 may include an outer surface 180, which defines a portion of chamber 148. A diameter D1 of the outer portion 162 may be greater than a diameter D2 of inner portion 160, such that outer portion 162 is radially offset from outer surface 180 of inner portion 160. Outer portion 162 may further include an inner surface 182, which further defines a portion of chamber 148. Chamber 148 may be defined, at least in part, between inner portion 160 and outer portion 162, and more specifically, chamber 148 may be defined by outer surface 180 of inner portion 160 and inner surface 182 of outer portion 162. As discussed, chamber 148 may be configured to contain a fluid, such as air or other fluid, With reference to FIG. 5B and still to FIGS. 4A and 4B, multiwall tubing assembly 90 may comprise a second fitting 150 configured to couple to inner tube 108 and to first fitting 100. More specifically, second fitting 150 may be configured to couple to a distal end 114 of first fitting 100, and to a distal end 126 of inner tube 108. Second fitting 150 comprises a proximal end 152 and a distal end 154 opposite to the proximal end 152. Proximal end 152 of second fitting 150 may further include an inner proximal portion 156 and an outer proximal portion 158. Inner proximal portion 156 of second fitting 150 may be configured to couple to distal end 126 of inner tube 108. Outer proximal portion 158 of second fitting 150 may be configured to couple to distal end 114 of first fitting 100. In various embodiments, second fitting 150 may be coupled to or integral with inner tube 108 and/or first fitting 100. In various embodiments, inner proximal portion 156 of second fitting 150 may be mechanically fastened, welded, brazed, adhered and/or otherwise attached to distal end 126 of inner tube 108, and similarly, outer proximal portion 158 of second fitting 150 may be mechanically fastened, welded, brazed, adhered and/or otherwise to distal end 114 of first fitting 100.

Second fitting 150 may further be defined by an inner portion 190 and an outer portion 192. Outer portion 192 may be formed concentrically around inner portion 190. Inner portion 190 and outer portion 192 may be integrally formed. A diameter D3 of the outer portion 192 may be greater than a diameter D4 of inner portion 190, such that outer portion 192 may be radially offset from the outer surface of inner portion 190, such that outer portion 192 is radially offset from inner portion 190.

Second fitting 150 may further define second fluid passage 124, which forms a continuous fluid path for second fluid path 140. Second fitting 150 may further define first fluid passage 134, which forms a continuous fluid path for first fluid path 142. First fluid path 142 may flow through first fluid passage 134 defined between first tube 102 and inner tube 108, and between first fitting and inner tube 108, and between first fitting 100 and second fitting 150. First fluid path 142 may exit second fitting 150 through one or more apertures 164 in second fitting 150. Second fluid path 140 may flow through second fluid passage 124 defined by inner tube 108 and by second fitting 150. Second fitting 150 may maintain second fluid path 140 to be separate and fluidly isolated from first fluid path 142.

The distal end 154 of second fitting 150 may be configured to couple to bearing housing 78 and be configured to receive fluid from second fluid path 140. In various embodiments, a seal 166 may be disposed between distal end 154 of second fitting 150 and bearing housing 78. Seal 166 may be configured to provide a fluid-tight seal between second fitting 150 and bearing housing 78. Seal 166 may be disposed at an outlet of second fitting 150 and may be disposed between the second fluid path 140 and the first fluid path 142 to maintain fluid isolation of second fluid path 140 and first fluid path 142. Seal 166 may include, for example, a C-seal, brush seal, carbon seal, O-ring seal or other seal type. In this regard, a C-seal may have a cross-sectional shape that is partially circular. Seal 166 may provide sealing around a circumference of distal end 154 of second fitting 150.

Referring momentarily to FIG. 2 and still to FIGS. 4A and 4B, first fitting 100 may be used to couple a tube, such as first tube 102, to a bearing system 38 for delivering fluid to the bearing system 38, in accordance with various embodiments. As discussed above, first fitting 100 may couple first tube 102 and/or outer sleeve 104 to bearing housing 78. First fitting 100 may further be configured to maintain a position of first tube 102 with respect to bearing housing 78 and/or outer sleeve 104, for example, to hold first tube 102 in a fixed position relative to bearing housing 78 and/or outer sleeve 104. First fitting 100 may be similarly configured to maintain a position of outer sleeve 104 with respect to bearing housing 78 and/or first tube 102. Thus, first fitting 100 may provide structural support for the first tube 102 and outer sleeve 104.

Referring again to FIG. 3 and still to FIGS. 4A and 4B, first fitting 100 may receive the first fluid 96 from first fluid path 142. First fluid passage 134 may be defined through inner surface 116 of first fitting 100 and through an outer portion of second fitting 150. Thus, first fluid passage 134 may be an outer fluid passage of multiwall tubing assembly 90. First fitting 100 may be in fluid communication with first fluid passage 134 and may be configured to carry the first fluid 96 to bearing compartment path 88. Second fluid passage 124 may be defined through inner surface 120 of inner tube 108 and through an inner portion of second fitting 150. Thus, second fluid passage 124 may be an inner fluid passage of multiwall tubing assembly 90. Second fluid passage 124 may be configured to carry the second fluid 92 to bearing damper path 84. The first fluid 96 may have similar or different characteristics from the second fluid 92. For example, the first fluid 96 of first fluid path 142 may have a higher or lower pressure than the second fluid 92 of second fluid path 140. The first fluid 96 of first fluid path 142 may also have a higher or lower temperature than the second fluid 92 of second fluid path 140. Fittings 100, 150 may be any suitable material for the thermal environment encountered by the fittings 100, 150, including for example a metallic and/or non-metallic material.

Figure 6:
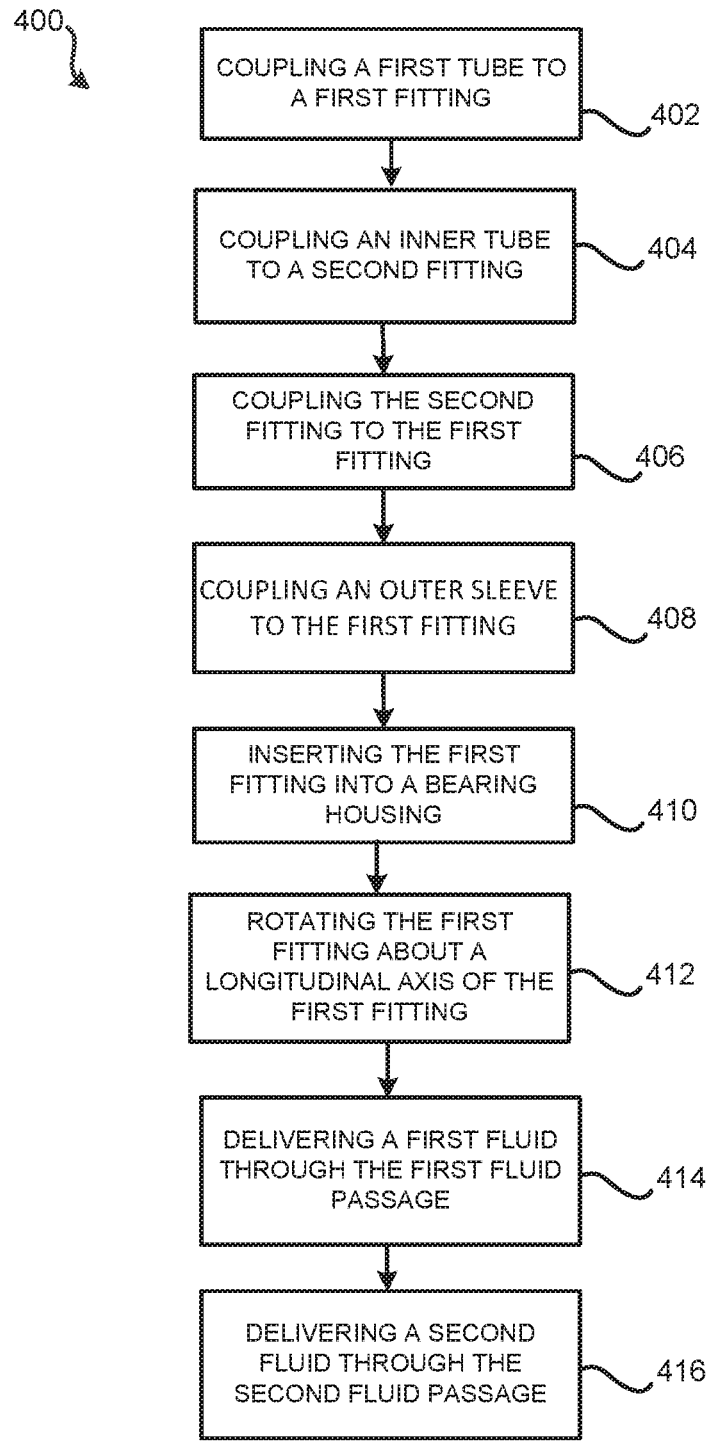
FIG. 6 illustrates a method for delivering lubricant to a bearing system, in accordance with various embodiments.

With reference to FIG. 6, a method 400 of delivering lubricant to a bearing system is shown, in accordance with various embodiments. Method 400 may comprise the step of coupling a first tube to a first fitting (step 402). The first tube may define a first fluid passage. The first fitting may have a first mating surface. Method 400 may comprise the steps of coupling an inner tube to a second fitting (step 404), coupling the second fitting to the first fitting (step 406), and coupling an outer sleeve to the first fitting (step 408). The first tube and the outer sleeve may define a chamber therebetween. Method 400 may comprise the step of inserting the first fitting into a bearing housing (step 410). The bearing housing may have a second mating surface with a complementary shape to the first mating surface of the first fitting. Method 400 may comprise the step of rotating the first fitting about a longitudinal axis of the first fitting (step 412). Method 400 may comprise the steps of delivering a first fluid through the first fluid passage (step 414), and delivering a second fluid through the second fluid passage (step 416).

Step 404 and step 406 may be prior to inserting the first fitting into the bearing housing (step 410). The first fluid passage may be defined between the first tube and the inner tube. A second fluid passage may be defined by the inner tube. Step 408 of coupling the inner tube to the second fitting may be prior to or after step 404 and step 406.

Step 412 may further comprise rotating the first fitting to contact the first mating surface of the first fitting with the second mating surface of the bearing housing. Step 412 may further comprise rotating the first fitting to couple the second fitting to the bearing housing. The first fluid passage may be in fluid communication with a bearing compartment path and/or a bearing damper path defined by the bearing housing. A pressure of the second fluid during engine startup may be greater than a pressure of the first fluid during engine startup. A pressure of the first fluid and a pressure of the second fluid may be substantially the same after engine startup. Step 414 may further comprise delivering the first fluid and/or the second fluid to a bearing damper. Step 416 may further comprise delivering the first fluid and/or the second fluid to a bearing compartment.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A mid-turbine frame for a gas turbine engine, comprising:
   a bearing system including a bearing housing;
   a first tube defining a first fluid passage configured to carry a first fluid to the bearing system;
   an outer sleeve disposed around the first tube and defining a chamber between the first tube and the outer sleeve;
   a first fitting coupled to the first tube and to the outer sleeve, the first fitting comprising:
      an inner portion having an inner surface further defining the first fluid passage,
      an outer portion disposed around the inner portion and further defining the chamber therebetween, the chamber configured to contain a fluid,
      an outer surface having a first mating surface comprising a frustoconical shape, and
      a flange extending radially outward from the outer surface, wherein the first fitting is monolithic.

2. The mid-turbine frame of claim 1, wherein an angle of the first mating surface relative to a longitudinal axis of the first fitting ranges from 15 to 50 degrees.

3. The mid-turbine frame of claim 1, wherein the first mating surface of the first fitting contacts a second mating surface of the bearing housing to form an interference fit in response to rotating the first fitting within the bearing housing.

4. The mid-turbine frame of claim 1, further comprising an inner tube disposed within the first tube, wherein the inner tube is coupled to the bearing housing by a second fitting.

5. The mid-turbine frame of claim 4, wherein the second fitting is coupled to the bearing housing and to the first fitting.

6. The mid-turbine frame of claim 1, wherein the flange of the first fitting comprises a polygonal shape configured to engage a wrench during installation.

7. The mid-turbine frame of claim 1, wherein the outer surface of the first fitting further comprises a threading configured to thread into the bearing housing.

8. The mid-turbine frame of claim 1, wherein the bearing system further comprises a bearing compartment, and wherein the bearing housing defines a bearing compartment path.

9. The mid-turbine frame of claim 8, wherein the first fluid passage is in fluid communication with the bearing compartment path.

* * * * *